United States Patent
Yamashita

(10) Patent No.: US 7,381,280 B2
(45) Date of Patent: Jun. 3, 2008

(54) MANUFACTURING METHODS OF FLEXIBLE BONDED MAGNET AND MOTOR USING THE SAME

(75) Inventor: Fumitoshi Yamashita, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 661 days.

(21) Appl. No.: 10/499,509

(22) PCT Filed: Apr. 24, 2003

(86) PCT No.: PCT/JP03/05241

§ 371 (c)(1),
(2), (4) Date: Jun. 18, 2004

(87) PCT Pub. No.: WO03/092021

PCT Pub. Date: Nov. 6, 2003

(65) Prior Publication Data

US 2005/0081961 A1 Apr. 21, 2005

(30) Foreign Application Priority Data

Apr. 25, 2002 (JP) .............................. 2002-123964

(51) Int. Cl.
*H01F 1/04* (2006.01)
(52) U.S. Cl. .................... 148/104; 148/120
(58) Field of Classification Search ............ None
See application file for complete search history.

(56) References Cited

U.S. PATENT DOCUMENTS

2002/0043301 A1* 4/2002 Walmer et al. ............. 148/301

FOREIGN PATENT DOCUMENTS

| EP | 1 205 949 A2 | * | 5/2002 |
|---|---|---|---|
| JP | 55-120109 A | | 9/1980 |
| JP | 06-87634 | | 8/1987 |
| JP | 2528574 | | 2/1993 |
| JP | 05-055021 A | | 3/1993 |
| JP | 05-315116 A | | 11/1993 |
| JP | 05-2999221 | | 11/1993 |
| JP | 08-078228 | * | 3/1996 |
| JP | 09-074010 A | | 3/1997 |
| JP | 11-111518 A | | 4/1999 |
| JP | 2001-230111 A | | 8/2001 |

OTHER PUBLICATIONS

English translation of International Search Report for PCT/JP03/05241, dated Jul. 22, 2003.

* cited by examiner

*Primary Examiner*—John P. Sheehan
(74) *Attorney, Agent, or Firm*—RatnerPrestia

(57) ABSTRACT

Methods for manufacturing a flexible bonded magnet, and a high-efficiency small motor using the magnet are disclosed. The flexible bonded magnet is manufactured through the processes of compressing a new compound consisting of flexible thermosetting resin composite and magnetic powder, which contains thermosetting resin, thermoplastic resin, etc.; heat-curing a green sheet derived from the above process; and rolling.

26 Claims, 8 Drawing Sheets

US 7,381,280 B2

MANUFACTURING METHODS OF FLEXIBLE BONDED MAGNET AND MOTOR USING THE SAME

TECHNICAL FIELD

The present invention relates to a flexible bonded magnet produced from rare earth system magnetic powder, and a method of manufacturing a motor using the flexible bonded magnet.

BACKGROUND ART

Quite a number of small motors are used in personal computers and the peripheral devices, IT-related appliances and the like apparatus in the field of advanced technologies. These motors are requested to be more compact in the size, higher in the output and efficiency, along with the ongoing pursuit of compactness and lightness in the appliance sector. Among the total production number of small motors, DC motors account for approximately 70%. Most of the general-use DC motors use rubber bonded ferrite magnets. High-performance DC motors employ ring-shaped bonded magnets produced by compressing a composite of magnetically isotropic Nd—Fe—B system magnetic powder and a rigid thermosetting resin such as epoxy resin. Technological developments in the small motors represent the improvements achieved in the field of bonded magnets manufactured by bonding a magnetic powder with a binder.

FIG. 13 describes the technology combinations used for manufacturing conventional bonded magnets. The magnetic powder can be a hard ferrite system magnetic powder, an Alnico system magnetic powder or a rare earth system magnetic powder. The binder can be a flexible resin (e.g. rubber, thermoplastic elastomer), a rigid thermoplastic resin or a rigid thermosetting resin. The forming process can be a calendering, an extrusion, an injection molding or a compression. Conventional combination of these items is indicated with solid lines.

It has been known that the rare earth magnetic powders can be combined with a flexible resin, a rigid thermoplastic resin and a rigid thermosetting resin. It is also known that the rare earth magnetic powders can be combined with a calendering, an extrusion, an injection molding or a compression. Namely, the rare earth magnetic powders are known to be compatible with any one of the items described in the binders and the processes. In the combination of compression process and rare earth system magnetic powder, however, the binder is limited to a rigid thermosetting resin, such as an epoxy resin.

Meanwhile, there are following disclosures in the flexible bonded magnet sector for use in small motors whose output power is lower than several tens of watts, which being subject of the present invention: Japanese Patent No. 2766746 and Japanese Patent No. 2528574 disclose bonded magnets produced by a process of rolling magnetic materials made of rare earth element system magnetic powders and flexible resins. Permanent magnet type motors using the above sheet-formed flexible bonded magnets are also disclosed. However, the maximum energy product (hereinafter referred to as MEP) of these bonded magnets is in the level as low as 50 kJ/m3. Japanese Patent Laid-Open Application No. H5-299221 teaches a method of manufacturing a bonded magnet by rolling a mixture of rare earth-iron-nitrogen system magnetic powder and flexible resin. MEP of this bonded magnet is 42 kJ/m3. Japanese Patent Examined Publication No. H6-87634 discloses a bonded magnet manufactured by compressing a magnetically isotropic R—Fe—B (R signifying at least either one of Nd and Pr) rare earth system magnetic powder and a rigid epoxy resin. A permanent magnet type motor using a multipole-magnetized ring magnet is also disclosed. MEP of which is 77 kJ/m3.

In order to implement a bonded magnet for small motors that is more efficient than the above-described conventional ones, it is essential to have a new binder system and an optimized processing. Specific characteristics needed for the new binder system are that it has a strong adhesive strength and the density of bonded magnet can be raised easily. Insufficient adhesive strength causes partial fracture of magnet body, and the fractured particle would scatter inviting serious damages. If the density is not high enough, the magnetic characteristics do not improve. The present invention aims to solve the above problems, and offer a method for manufacturing a highly-efficient and reliable bonded magnet for use in small motors. A method for manufacturing permanent magnet type motors using the bonded magnet is also disclosed in the present invention.

DISCLOSURE OF INVENTION

A method for manufacturing a flexible bonded magnet is offered. It includes process steps of compressing a compound made of rare earth system magnetic powder and flexible thermosetting resin composition, i.e a composite curing with heat a green sheet provided through the above process, and rolling the green sheet. The thermosetting resin composite including a solid epoxy oligomer in the normal room temperature and a polymide powder having thermo-compression bonding property provided with stickiness in the normal room temperature.

DETAILED DESCRIPTION OF PREFERRED EMBODIMENTS

Figure 1:
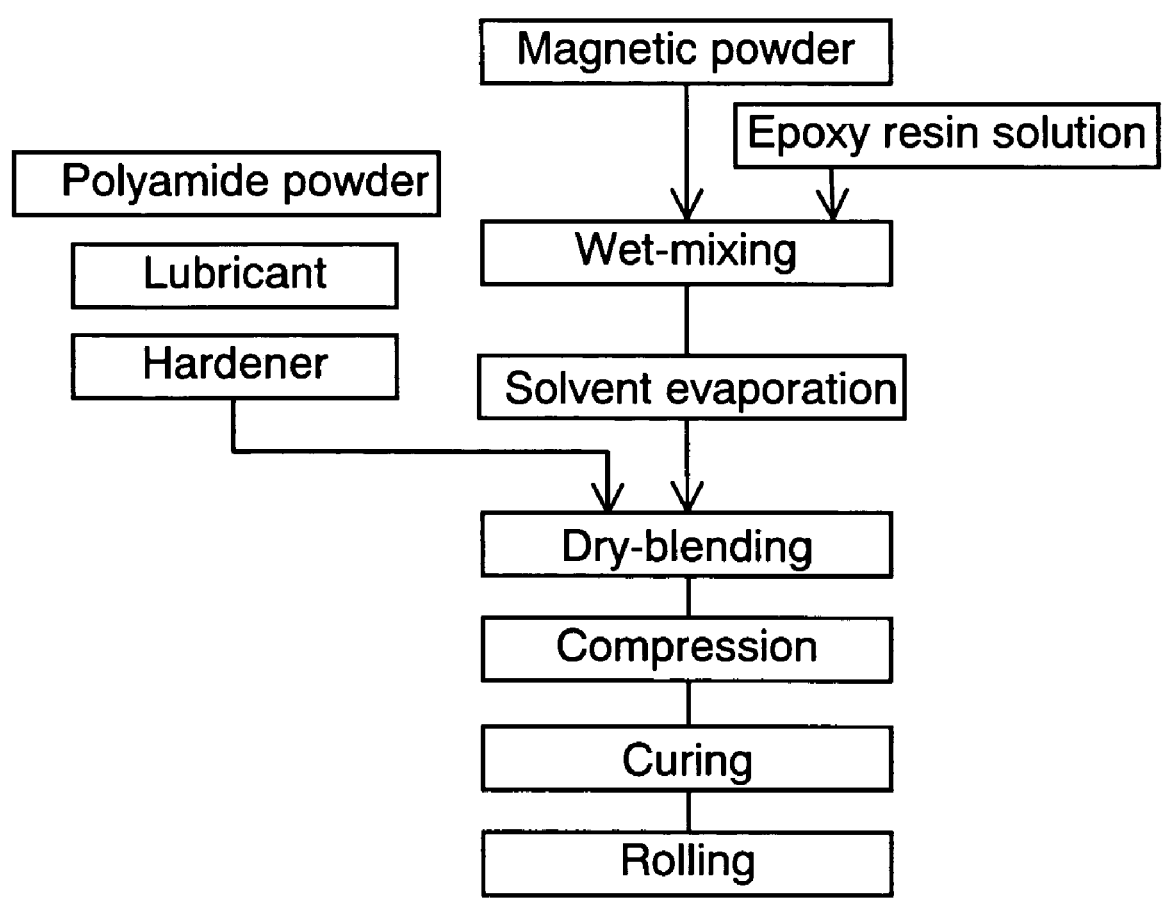
FIG. 1 shows a manufacturing process chart of a flexible bonded magnet in the present invention.

It is preferred in the present invention to constitute a binder system with an solid epoxy oligomer in the normal room temperature, a polyamide powder having stickiness in the normal room temperature and a latent epoxy hardener in powder state. The stickiness of polyamide powder in the present invention is provided by applying an adhesive agent, a tackifier, a plasticizer, etc. It works to fix rare earth element system magnetic powder and binder together in the compound state before compression.

The polyamide powder means in the present invention at least either one of polyamide powder and polyamide-imide powder. Nylon 6, nylon 66, nylon 610, nylon 11, nylon 12, etc. can be used for the polyamide powder. Nylon 11 and nylon 12, among others, are preferred because of their good compatibility with adhesive agent or tackifier.

Example of the polyamide-imide powder includes a condensation product of trimellitic acid derivative and aromatic diamine. Example of the trimellitic acid derivative includes trimellitic anhydride; trimellitic anhydride monochloride; 1,4-dicarboxy-3-N,N-dimethyl carbamoyl benzene; 1,4-dicarbomethoxy-3-carboxy benzene; 1,4-dicarboxy-3-carbophenoxy benzene; and ammonium salts formed of trimellitic acid, ammonia, dimethylamine, triethylamine, etc. Among these, trimellitic anhydride, trimellitic anhydride monochloride, etc. are often used with preference. Example of the aromatic diamine includes 2,2-bis[4-(4-aminophenoxy)phenyl] propane; 2,2 bis[4-(4-aminophenoxy)phenyl] butane; 1,1-bis[4-(4-aminophenoxy)phenyl]cyclohexane; 1,1-bis[4-(4-aminophenoxy)phenyl]cyclopentane; bis[4-(4-aminophenoxy)phenyl]sulfone; bis[4-(4-aminophenoxy)phenyl]ether; 4,4'-carbonyl bis(P-phenylene oxy) dianiline, etc.

Among these, 2,2-bis[4-(4-aminophenoxy)phenyl] propane is preferred. Whenever necessary, a mixture of the above diamine may be used. Furthermore, the already known diamine, for example, 4,4'-diamino diphenyl ether; 4,4'-diamino diphenyl methane; 4,4'-diamino diphenyl sulfone; meta-phenylene diamine; piperazine; hexamethylendiamine; hepta methylendiamine; tetramethylendiamine; para-xylylendiamine; meta-xylylendiamine; 3-methyl heptamethylenediamine; 1,3-bis(3-aminopropyl)tetramethyl disiloxiane, etc. may be used in addition. For the adhesive agent, tackifier and resin in the present invention, following items can be used.

The adhesive agent and tackifier may be selected from among the group of natural rosin (gum rosin, wood rosin, tall oil rosin, etc.), denatured rosin (polymerized rosin, hydrogenated rosin, maleic acid modified rosin, etc.); cumarone-indene resin; terpene system resin; petroleum system resin; and phenol system resin, etc. The resin may be selected from among the group of ethylene vinyl acetate copolymer; ethylene acrylic acid copolymer; ethylene ethyl acrylate copolymer; ethylene methyl acrylate copolymer; ethylene propylene copolymer having a molecular weight higher than 30,000 or ethylene butene copolymer; poly butene; wax, etc. These items may be used either in solo, or in a combination of two or more.

The tackifier expedites thermal plastic deformation of polyamide powder and improves the wetting property of junction surface during compression of compound. In this way, the thermal compression bonding property is raised with the polyamide powder, or epoxy oligomer. Plasticizer is used whenever necessary. It lowers viscosity of the polyimide powder containing adhesive agent, and improves the flexibility and the wetting property. Practical example includes dibenzyl toluenes, p-hydroxy benzoate, benzenesulfonamides, etc., which are the compounds having a relatively good compatibility with the polyamide powder.

From the view point of the compatibility and the plasticization efficiency, an addition product of glycidyl compound and carboxylic acid having the following structure is more preferred.

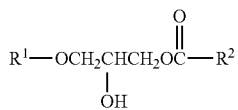

where R1 and R2 signify at least one hydrocarbon group selected from among the group of aliphatics, alicyclics and aromatics. At least either one of R1 and R2 is an aromatic hydrocarbon group.

From the view point of practical usage, the above-described examples of addition product are divided into following three categories: (A) an addition product of aliphatic glycidyl ether, or alicyclic glycidyl ether, and aromatic carboxylic acid, (B) an addition product of aromatic glycidyl ether and aliphatic carboxylic acid, or alicyclic carboxylic acid, and (C) an addition product of aromatic glycidyl ether and aromatic carboxylic acid. The compounds of each of the above categories are provided through the following procedure: an exemplary process is; adding a certain specific carboxylic acid into corresponding glycidyil ether in the presence of a catalyst, heating and stirring at a temperature 60-120□ in the normal atmospheric pressure, or in a reduced pressure. As for the catalyst, a tertiary amine, an imidazole, a metal ester system compound, a phosphorus system compound, etc. can be used. Polyimide powder mixed with plasticizer is also provided with stickiness.

In order to intensify the bonding force with binder, it is preferred to cover the surface of rare earth system magnetic powder beforehand with an epoxy oligomer, which is solid in the normal room temperature. Average thickness of the surface coating should be less than 0.1 μm. This is important in order to prevent a deterioration with the orientation, which is caused by secondary mutual cohesion within magnetically anisotropic rare earth system magnetic powder.

Method of covering rare earth system magnetic powder with epoxy oligomer is: First dissolve the relevant epoxy oligomer into an organic solvent, and wet-mix it with the rare earth system magnetic powder. And then, crush the massive mixture after removing the solvent. In order to have an increased cross-linking density with the epoxy oligomer, a novolak type epoxy, which has epoxy group in the molecular chain too, is preferred. As for the powder epoxy hardener for cross-linkage with the epoxy oligomer, at least one item selected from among the group of dicyanodiamide and the derivative, dihydrazide carboxylate, and diaminomaleonitrile and the hydrazide derivative is used. These are generally high-melting point compounds which do not dissolve easily in an organic solvent. Preferred grain diameter of which is within a range of several μm to 100 μm. The dicyanodiamide derivative includes, for example, ortho-tolylbiguanide, α-2,5-dimethylbiguanide, α-ω-diphenyl-biguanide, 5-hydroxybutyl-1-biguanide, phenylbiguanide, α,ω-dimethylbiguanide, etc. As for the dihydrazide carboxylate, hydrazide succinate, hydrazide adipate, hydrazide isophthalate, 4-hydroxy benzoic hydrazide, etc. can be used. These hardeners should preferably be added to the compound through a dry-blending process.

In order to avoid sticking of compound onto molding die, it is preferred to use a lubricant. As for the lubricant, at least one item selected from among the group of higher fatty acid, higher fatty acid amide and metal soap having a melting point higher than the temperature set for the molding die is used. Amount of the lubricant should be not more than 0.2 weight %, and applied to the compound preferably through a dry-blending process.

Preferred amount of the rare earth system magnetic powder contained in the compound is 92-97 weight %, the compression pressure to be not less than 4 ton/cm2. The curing temperature of green sheet should be a temperature that is higher than the relevant epoxy oligomer's reaction starting temperature. In the final rolling step, the rolling rate should be set at 2% or higher, the marginal wrap-around diameter to be 8 mm or less; or rolling rate at 10% or higher, the marginal wrap-around diameter to be 2 mm or less. By so doing, a flexible bonded magnet that provides a good matching between the mechanical strength and the magnetic characteristics is implemented.

In order to reduce the cogging torque with high efficiency small motors, green sheets are ultimately built within the motors, the green sheet may be produced to a finished state where the width is uneven or thickness is not homogeneous. While on the other hand, it is difficult to produce a green sheet into an uneven width or uneven thickness, through the process of rolling or extrusion.

Now, the magnetic powder used in the present invention is described. Examples of magnetically isotropic rare earth magnetic powder include a Nd—Fe—B system spherical powder produced by the spinning cup atomization process; a Nd—Fe—B system flake powder, an αFe/Nd—Fe—B system flake powder, a Fe3B/Nd—Fe—B system flake powder, a Sm—Fe—N system flake powder, an αFe/Sm—Fe—N system flake powder, produced by the melt spinning process. Ratio of grain diameter to thickness of these flake powder should preferably be lower than 4. As for the magnetically anisotropic rare earth system magnetic powder, a Nd—Fe—B system massive powder produced by the hot upsetting process, a magnetically anisotropic rare earth Nd—Fe—B system massive powder produced by the HDDR (Hydrogenation-Disproportionation-Desorption-Recombination) process and the like powders may be used.

The above-described powders whose surface has been processed to be inert using a photo-decomposition Zn_can also be used. Coercive force at 20° C. of these magnetic powders after a 4 MA/m pulse magnetization should preferably be not lower than 1.1 MA/m. As for the magnetically anisotropic rare earth system magnetic powder, a Sm—Fe—N system fine powder having magnetically anisotropic property produced by the RD (Reductive Diffusion) process, and the above powder whose surface has been processed to be inert can also be named. Coercive force at 20° C. of these powders after a 4 MA/m pulse magnetization should preferably be not lower than 0.6 MA/m.

The above-described rare earth system magnetic powders may be used either in solo or as a mixture of two or more. However, it is preferred that average value of coercive force at 20° C. of the entire mixed rare earth magnetic powders after a 4 MA/m pulse magnetization is not lower than 0.6 MA/m. After it is finally rolled, the surface may be provided with a hot-melt type self-bonding layer, or a self-bonding layer having a film-forming function formed of one or two, or more, types of polymer mixed with a blocked isocyanate.

Through the above-described measures, ease of mounting the bonded magnets in permanent magnet type motors can be raised. Using the flexible bonded magnet in the present invention for the stator or the rotor, various types of permanent magnet type motors can be manufactured. For example, a permanent magnet type DC motor whose permanent field magnet is a flexible bonded magnet curled in a ring shape, fixed along the inner circumference of a cylindrical frame and multipole-magnetized; a permanent magnet type motor which uses a ring-shape flexible bonded magnet disposed along the inner circumference of a cylindrical frame as the radial-gap type rotor; and a permanent magnet type motor which uses a ring-shape flexible bonded magnet disposed along the outer circumference of a cylindrical frame as the surface-magnet type rotor.

Among these types of motors, a permanent magnet type motor using a flexible bonded magnet whose MEP in the normal room temperature after a 4 MA/m pulse magnetization is higher than 140 kJ/m3 seems to be promising as the next generation version of the permanent magnet type motors based on a combination of Nd—Fe—B system flake powder made by the melt spinning method, rigid thermosetting resin and compression process. A permanent magnet type motor using a flexible bonded magnet whose MEP in the normal room temperature after a 4 MA/m pulse magnetization is higher than 40 kJ/m3 seems to be promising as the next generation version of the permanent magnet type motors based on ferrite rubber magnets.

First Exemplary Embodiment

An exemplary embodiment of the present invention is detailed below. It is to be noted that the scope of the present invention is not limited by description of embodiments. The drawings of motors have been prepared to provide the concept; they are not intended to offer precise actual dimensions.

A process of manufacturing a flexible bonded magnet is described with reference to FIG. 4. In the present embodiment, three kinds of rare earth system magnetic powders are used for the manufacturing. The first one is magnetically anisotropic Nd—Fe—B system massive powder produced by the HDDR process (composition: Nd12.3 Dy0.3 Fe64.7 Co12.3 B6.0 Ga0.6 Zr0.1). Hereinafter this is referred to as magnetic powder A; average grain diameter of which is 55 μm. The second one is Nd—Fe—B system spherical powder produced by the spinning cup atomization process (composition: Nd13.3 Fe62.5 B6.8 Ga0.3 Zr0.1). This one is referred to as magnetic powder B; average grain diameter is 80 μm. The third one is Nd—Fe—B system flake-shape powder produced by the melt spinning process (composition: Nd12 Fe77 Co5 B6). This one is referred to as magnetic powder C; average grain diameter is 80 μm.

Next, binder system is described. It is formed of a novolak type solid epoxy oligomer in the normal room temperature, a latent epoxy hardener in powder state whose grain diameter is smaller than 15 μm, a polyamide powder frozen-crushed beforehand to be smaller than 100 μm and contains an adhesive agent, and a lubricant whose grain diameter is smaller than 10 μm. The latent epoxy hardener in powder state has the following chemical structure:

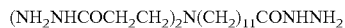

Dissolve the relevant epoxy oligomer in an organic solvent (acetone) to prepare an epoxy resin solution. Using a sigma blade mixer, wet-mix the magnetic powder A with a certain amount of the resin solution so that the solid ingredient occupies 0.5 weight %. Heat the wet mixture to 60-80° C. to have solvent evaporated. Crush the dried massive mixture.

If the epoxy resin surface coat is thinner than approximately 0.1 μm, there is hardly any change in the grain diameter distribution with the magnetic powder A before and after the surface coating. The same applies also to the magnetic powders B and C. There is hardly any change in the after-curing strength even if the average coating thickness is increased up to 0.2 μm.

And then, dry-mix, using a mortar in the normal room temperature, the magnetic powder A having the epoxy oligomer-surface coat with polyamide powder containing 20% adhesive agent for 3-7 weight %, hardener for 0.05 weight %, and lubricant (calcium stearate, grain diameter less than 10 μm) for 0.05 weight %. In this way, compound in the powder state is provided. Because of the lubricant contained, this compound has a certain powder fluidity that is suitable for processing in a powder processing facility. The powder-state compound maintains a superior storage stability for a long time in the normal room temperature. Any one of the adhesive agents may be used.

The terminology normal room temperature in the present invention means a temperature range 15-40° C. Next, apply the powder compound in a die cavity of powder compacting press. The molding die is locally heated to 70-80° C., only at the upper and the lower punches and the neighborhood of cavity. The powder compound disposed in the cavity is compressed by the upper and lower punches under the influence of a 1.4 MA/m axial magnetic field. After demagnetization, a flexible green sheet is taken out of the machine in a near-net shape. Although the green sheet is soft, there is no practical problem in handling it. The green sheet is heated for 20 min. at 180° C. for curing. A bonded magnet is thus provided. It is finally rolled with revolving roller heated at 60-80° C., to produce a sheet-formed flexible bonded magnet of 2-20% rolling rate. Likewise, the magnetic powder B and magnetic powder C can be processed into sheet-formed flexible bonded magnets. However, no magnetic field is applied during compression process on the magnetically isotropic magnetic powders B and C.

For comparison, following two magnet samples are produced representing the widely-used magnets in small motors: a magnet produced based on the combination of a ferrite system magnetic powder/a flexible resin/a rolling or extrusion process (this type of magnet is hereinafter referred to as conventional ferrite bonded magnet); and a magnet produced based on the combination of the magnetic powder C/a rigid thermosetting resin such as epoxy resin/a compression process (hereinafter referred to as conventional rare earth system bonded magnet). Each of the magnets thus prepared are evaluated on with respect to the mechanical properties such as elongation, tensile strength, etc., the magnetic characteristics and irreversible flux loss derived from demagnetization curve, and other items. Furthermore, ease of mounting the flexible bonded magnet in small DC motors is evaluated through appraisal of the windability around a mandrel. The torque constant, which being a fundamental characteristic of motor, is also evaluated on.

Figure 2:
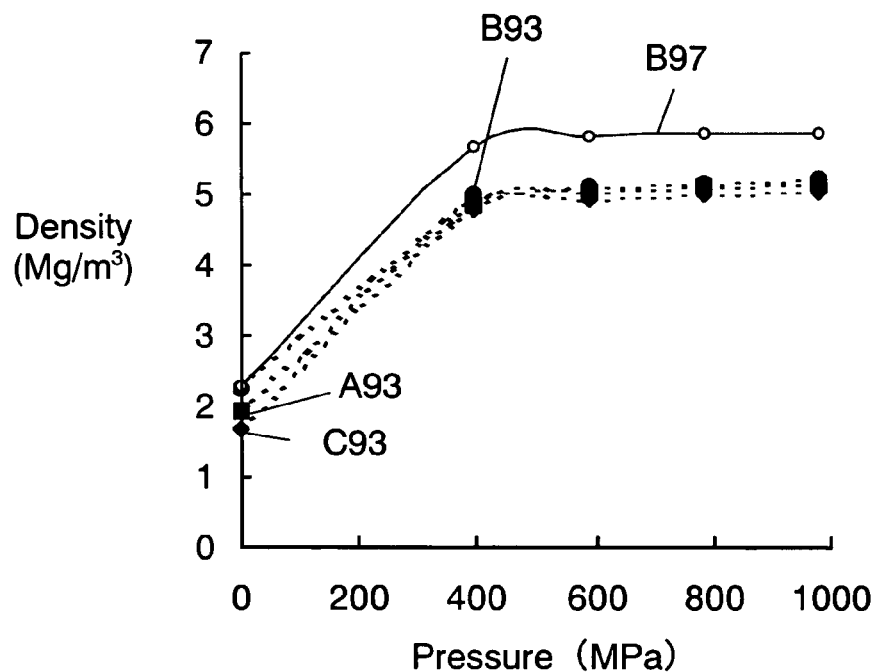
FIG. 2 is a chart showing a relationship between the density of green sheet and the forming pressure in the present invention.

FIG. 2 shows a relationship between the molding pressure and the density of green sheet. Where, curve A93 represents a green sheet containing the magnetic powder A for 93 weight %. Likewise, curve B93 and curve B97 represent, respectively, those green sheets containing the magnetic powder B for 93 weight % and 97 weight %. Curve C93 represents a green sheet containing the magnetic powder C for 93 weight %. Curve A97 is overlapping with the curves A93 and B93, so it is difficult to distinguish from each other. The green sheet measures 6.1 mm wide, 65 mm long, 1.1 mm thick, and the molding die temperature is 60-80° C.

As seen in the chart, the density almost saturates at a pressure approximately 400 MPa. Conventional rare earth bonded magnets require approximately 980 MPa for obtaining an identical density (approximately 5.8 Mg/m3). A flexible bonded magnet in the present invention realizes a comparable density with a lower pressure. The reason is that the polyamide grains have been softened by a 60-80° C. heat, and a sufficient plastic deformation has been taken place during the compound compression. Thanks to the low pressure, the rare earth system magnetic powder is damaged less during the compression process. As a result, deterioration of magnetic characteristics due to emergence of active surface can be reduced.

Figure 3:
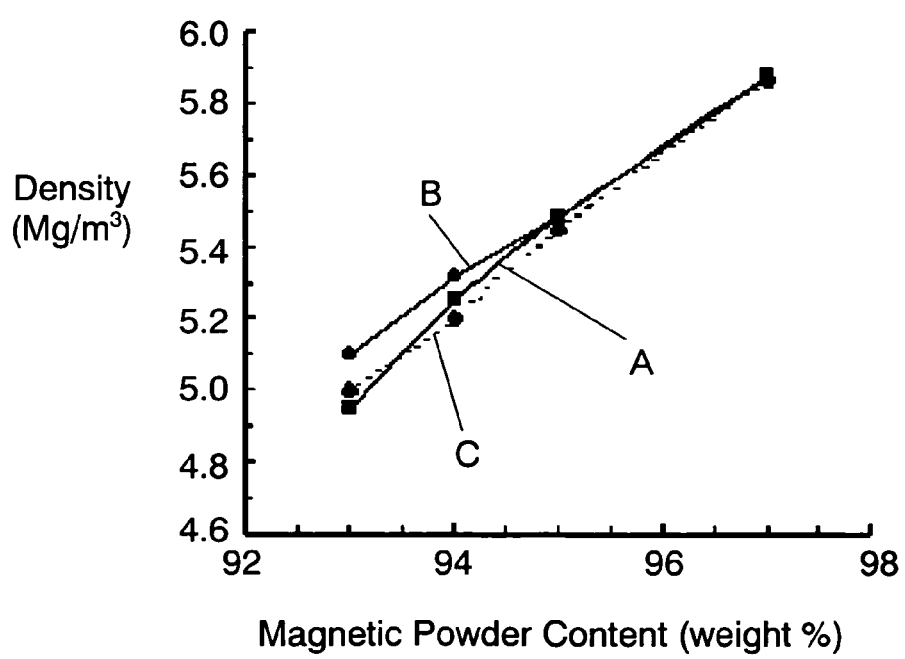
FIG. 3 is a chart showing a relationship between the density of flexible bonded magnet and the contained amount of magnetic powder in the present invention.

FIG. 3 shows a relationship between the quantity of the magnetic powders A, B and C and the density of flexible bonded magnet in the present invention. Where, curve A represents a bonded magnet produced from the magnetic powder A, curve B a bonded magnet produced from the magnetic powder B, and curve C a bonded magnet produced from the magnetic powder C. Each magnet measures 6.1 mm wide, 65 mm long and 1.1 mm thick. Compressing pressure at 60-80° C. is 490 MPa, curing conditions are 180° C. for 20 min.

As seen in FIG. 2 and FIG. 3, the magnetic powders A and B, whose grain shapes are close to a sphere, exhibit a higher density, hence it is easier to fill-in than the flake-shape magnetic powder C. Despite the above difference, the present embodiment is applicable to any types of the rare earth system magnetic powders, and implements a flexible bonded magnet whose density is higher than any of the known rubber magnets.

Figure 4A:
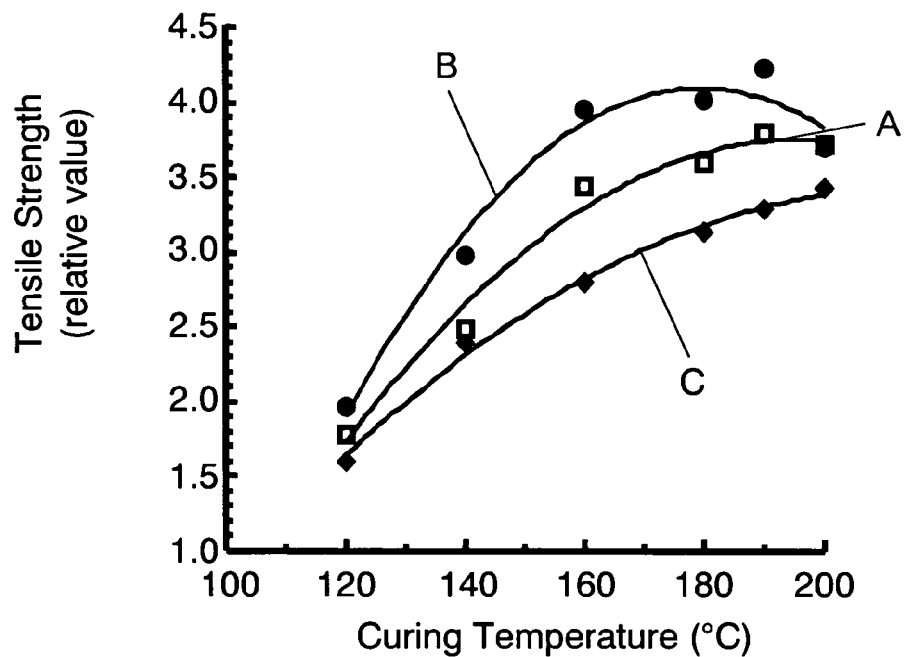
FIG. 4A is a chart showing a relationship between the green sheet curing temperature and the tensile strength of flexible bonded magnet in the present invention.
Figure 4B:
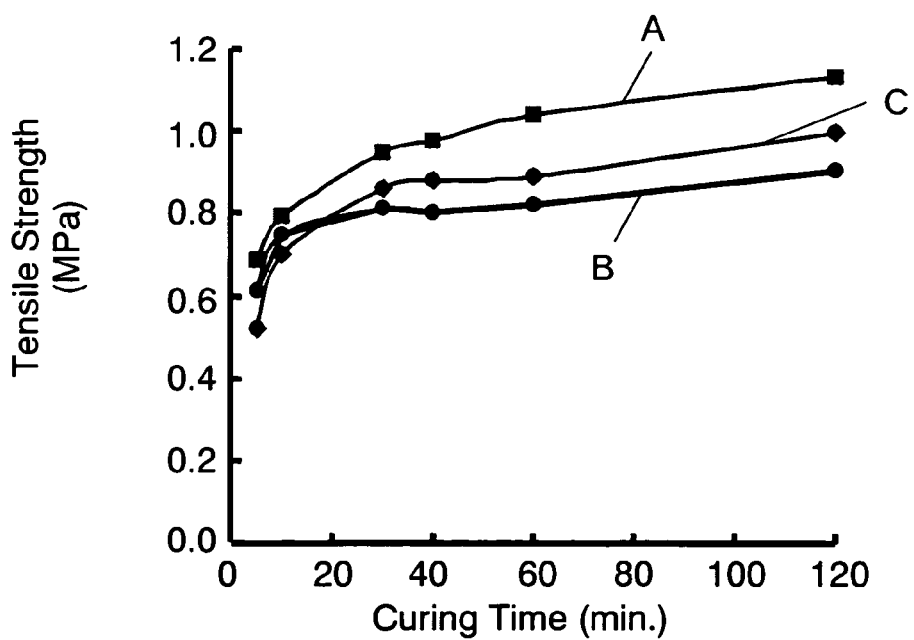
FIG. 4B is a chart showing a relationship between the green sheet curing time and the tensile strength of flexible bonded magnet in the present invention.

FIG. 4A shows a relationship between the tensile strength (relative value) and the heating temperature applied on green sheets made from the magnetic powders A, B and C. FIG. 4B shows a relationship between the tensile strength and the heating time of green sheets made from the magnetic powders A, B and C. In the charts, curve A represents a green sheet made from the magnetic powder A, curve B a green sheet made from the magnetic powder B and curve C a green sheet made from the magnetic powder C. Each magnet measures 6.1 mm wide, 65 mm long, 1.1 mm thick. Compression pressure at 60-80° C. is 490 MPa. No hardener is used in those shown in FIG. 4A and FIG. 4B.

The optimum curing temperature in the present embodiment is, as shown in FIG. 4A, approximately 180° C., regardless of whether it is of the magnetic powder A, B or C. Tensile strength of a flexible bonded magnet in the present invention increases to 2.5-4 times that at the green sheet state. The increase of tensile strength is observed after heating at a temperature higher than 120° C. This seems to have been caused by a curing reaction taken place between the epoxy group of epoxy oligomer contained in the compound in powder state and the active hydrogen in polyamide powder. Considering the heating time shown in FIG. 4B, the optimum curing conditions in the present embodiment seem to be 180° C. for 10-30 min.

Next, control of bonded magnet's flexibility by means of rolling is described. General practice of assembling a flexible bonded magnet in a small motor is first winding it around. So, the flexibility control is an important item for the flexible bonded magnets. The rolling process provides an effective tool for controlling the flexibility. The upper and lower rolls used have a 90 mm diameter, the roller temperature is 70° C. Flexibility is evaluated in terms of limit_diameter of a mandrel, around which a magnet can wind. The smaller the limit diameter, the greater is the flexibility. The dimensional change caused in a flexible bonded magnet as a result of rolling is also evaluated on.

Figure 5:
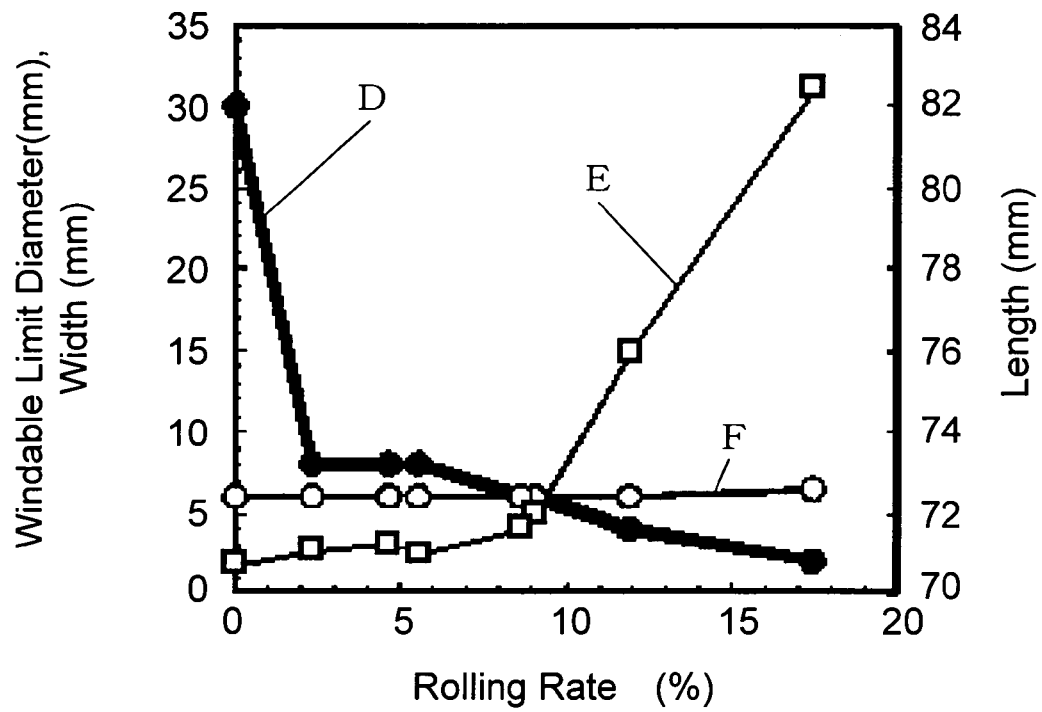
FIG. 5 shows a relationship among the rolling rate in the rolling, the windability of a rolled flexible bonded magnet around a mandrel and the dimensional change caused as the result of rolling, in the present invention.

FIG. 5 shows a relationship among the rate of reduction due to rolling, the windability of a flexible bonded magnet, and the dimensional change caused in the flexible bonded magnet. The lateral axis represents rolling rate, while the left longitudinal axis representing windable limit diameter and width, the right longitudinal axis representing magnet length. In the chart, curve D represents the windability, curve E the magnet length, and curve F the magnet width. The sample flexible bonded magnet is the one produced from the magnetic powder B (contents: 95 weight %). Rolling temperature is 70° C. Rolling rate is calculated on the basis of ratio of magnet thickness before and after the rolling. The magnet measures 6.1 mm wide, 65 mm long, and 1.1 mm thick.

As seen in the chart, the windability rapidly improves with those rolled at a rolling rate 2-10%. Moreover, the dimensional change of a magnet remains very small when the rolling rate is within a 2-10% range. For example, a 1.2 mm thick magnet can be bent to wind around a mandrel even smaller than 8 mm in the diameter. On the other hand, when the rolling rate is higher than 10%, the magnet dimension significantly increases in the rolling direction (length). Thus, a ring magnet smaller than 4 mm diameter can be manufactured by bending a 1.1 mm thick magnet using a mandrel of 2 mm diameter.

Figure 6:
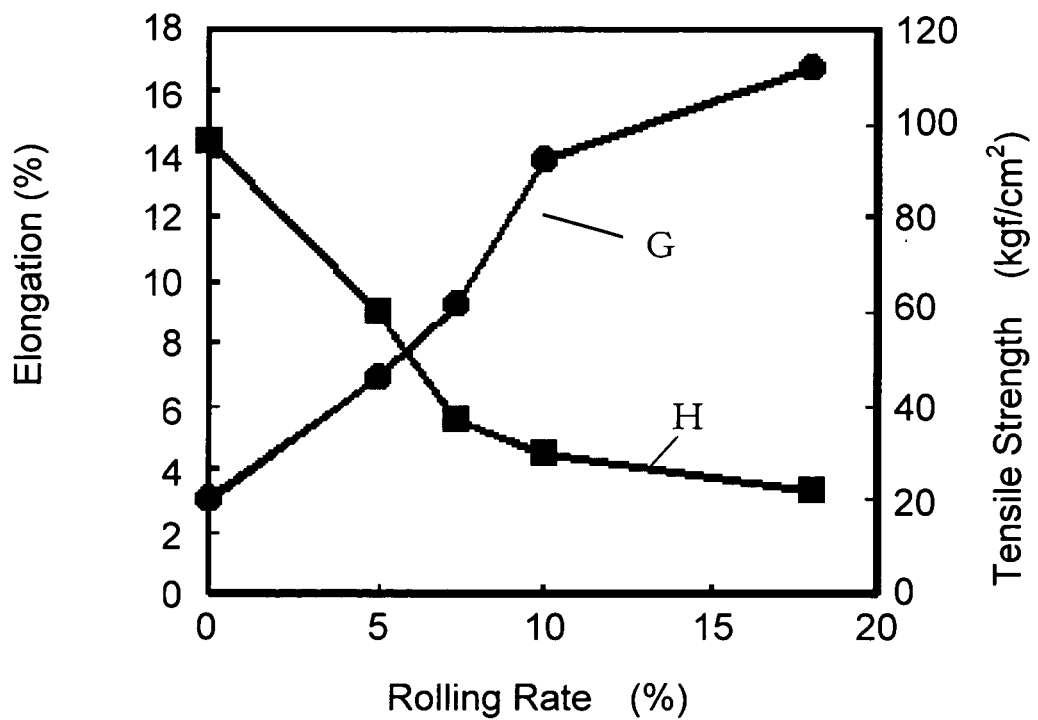
FIG. 6 shows a relationship among the rolling rate, the elongation of a flexible bonded magnet and the tensile strength, in the present invention.

FIG. 6 shows a relationship between the mechanical property of a flexible bonded magnet in the present invention and the rolling rate. Where, curve G represents the elongation, while curve H the tensile strength. The sample magnet is the one produced from the magnetic powder B (content: 95 weight %). Rolling temperature is 70° C., rolling rate is calculated on the ratio of magnet thickness before and after the rolling. The magnet measures 6.1 mm wide, 65 mm long, and 1.1 mm thick. As seen in the chart, the elongation of magnet in the rolling direction increases in an approximate proportion to the rolling rate. The tensile strength of magnet decreases inverse-proportionate to the rolling rate. Taking the elongation and the tensile strength into consideration, the rolling rate has been determined to be 5-10%. The ring magnets thus manufactured can be used in the actual motors.

Figure 7:
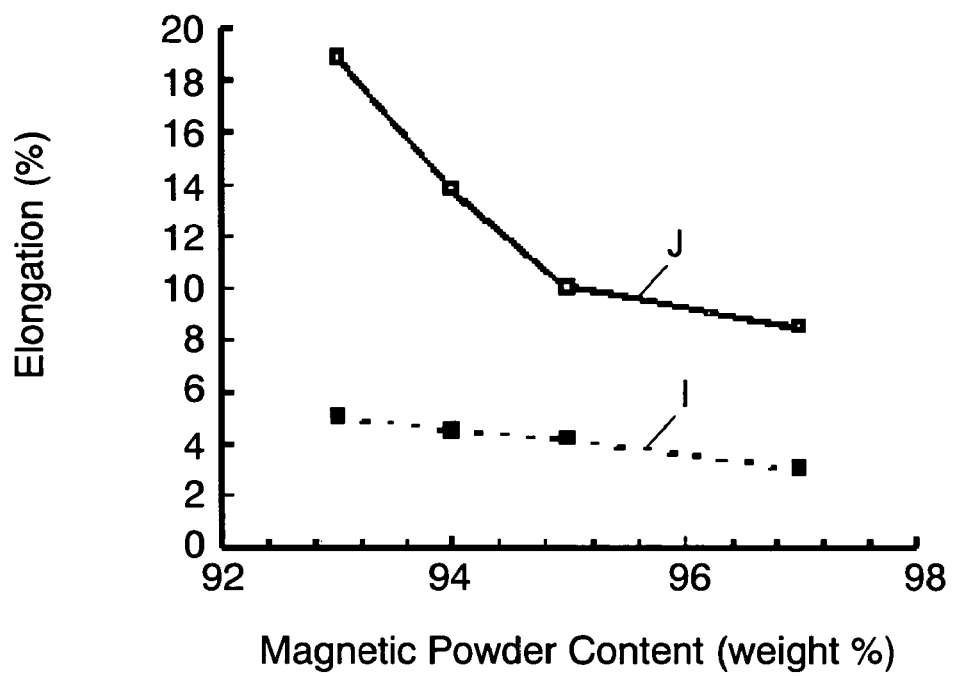
FIG. 7 is a chart showing a relationship between the amount of magnetic powder contained in flexible bonded magnet and the elongation before/after the rolling, in the present invention.

FIG. 7 shows a relationship between the amount of rare earth system magnet powder contained in a flexible bonded magnet in the present invention and the elongation before and after the rolling. Where, curve J represents the elongation after it is rolled at a 10% rolling rate, curve I representing the elongation before rolling. The flexible bonded magnet sample is the one produced from the magnetic powder A (content: 93-95 weight %). Rolling temperature is 70° C. Rolling rate is calculated based on the ratio of magnet thickness before and after the rolling. The magnet measures 6.1 mm wide, 65 mm long, and 1.1 mm thick.

As seen in the chart, the elongation of magnet decreases when content of the rare earth system magnetic powder exceeds 97 weight %. However, the rolling process brings about a flexibility. As the result, a 1.1 mm thick magnet can be wrapped around a mandrel of 10 mm diameter. As is already known, filling amount of the 97 weight % rare earth system magnetic powder is identical to that of conventional rare earth bonded magnet. Namely, the present invention provides an advantage that the same density level is made available by a lower compression pressure. Furthermore, elongation and tensile strength in the normal room temperature of a flexible bonded magnet in the present invention were in approximately the same level as those of conventional ferrite bonded magnets used in the general-use small motors.

Figure 8:
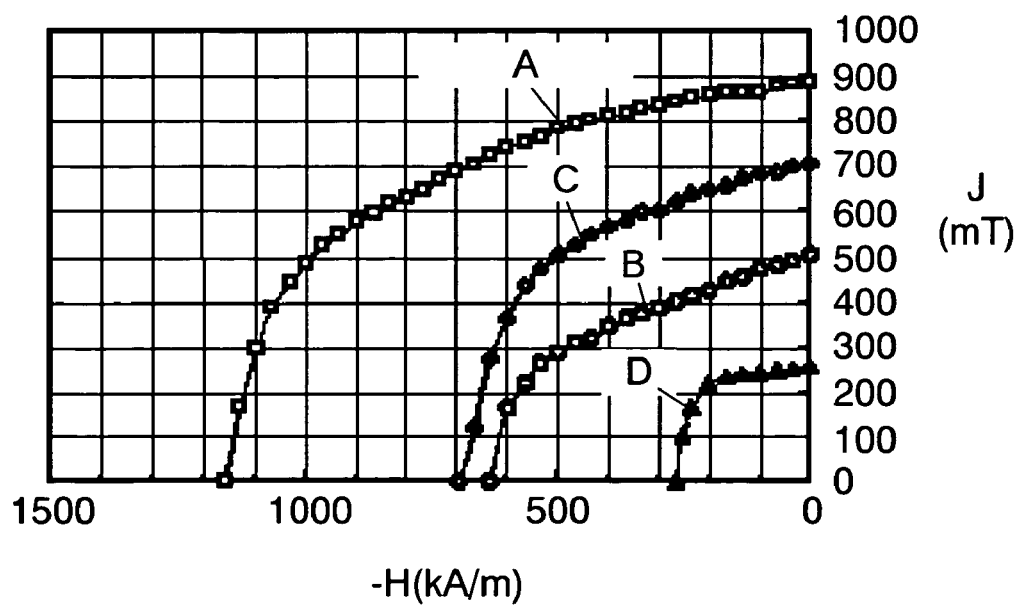
FIG. 8 compares the demagnetization curves of a flexible bonded magnet in the present invention, a conventional ferrite bonded magnet and a conventional rare earth bonded magnet.
Figure 9:
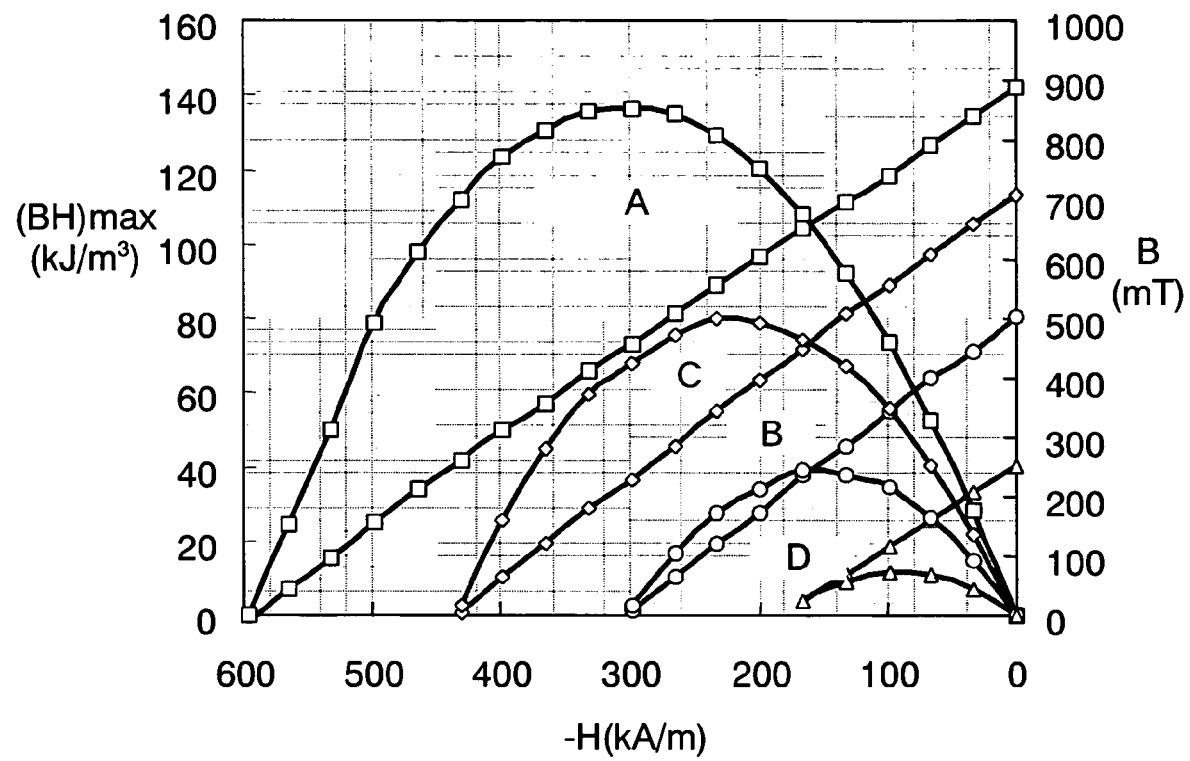
FIG. 9 compares the B-H curves of a flexible bonded magnet in the present invention, a conventional ferrite bonded magnet and a conventional rare earth bonded magnet.

FIG. 8 and FIG. 9 show demagnetization curve and B-H curve, respectively, of four kinds of magnets; viz. flexible bonded magnets in the present invention produced from the magnetic powder A and the magnetic powder B, a conventional ferrite bonded magnet and a conventional rare earth element bonded magnet. The magnets measure 7.5 mm wide, 7.5 mm long and 1.1 mm thick. Curve A and curve B represent, respectively, the flexible bonded magnets produced from the magnetic powder A and the magnetic powder B in the present invention; curve C a conventional rare earth element bonded magnet; and curve D a conventional ferrite bonded magnet. All the magnets were measured after they were magnetized in a 4 MA/m pulse magnetic field. The comparative magnet samples are those generally used for small DC motors or small brushless motors.

As seen in the charts, the flexible bonded magnets A and B in the present invention provide an evidently higher magnetic flux density at the gap between rotor iron core and stator magnet, as compared with those of conventional magnets C and D.

Describing practically, as shown in FIG. 14, MEP of a flexible bonded magnet produced from the magnetic powder A in accordance with the present invention (density: 5.84 Mg/m3) is 140 kJ/m3; namely, it is 1.75 times that the conventional rare earth element bonded magnet, 80 kJ/m3. MEP of a flexible bonded magnet produced from the magnetic powder B in accordance with the present invention (density: 5.45 Mg/m3) is 40 kJ/m3; namely, it is more than 3 times as high that the conventional ferrite rubber magnet. When the magnet is used as a ring magnet smaller than 10 mm diameter, it improves the efficiency of small motors.

Figure 10:
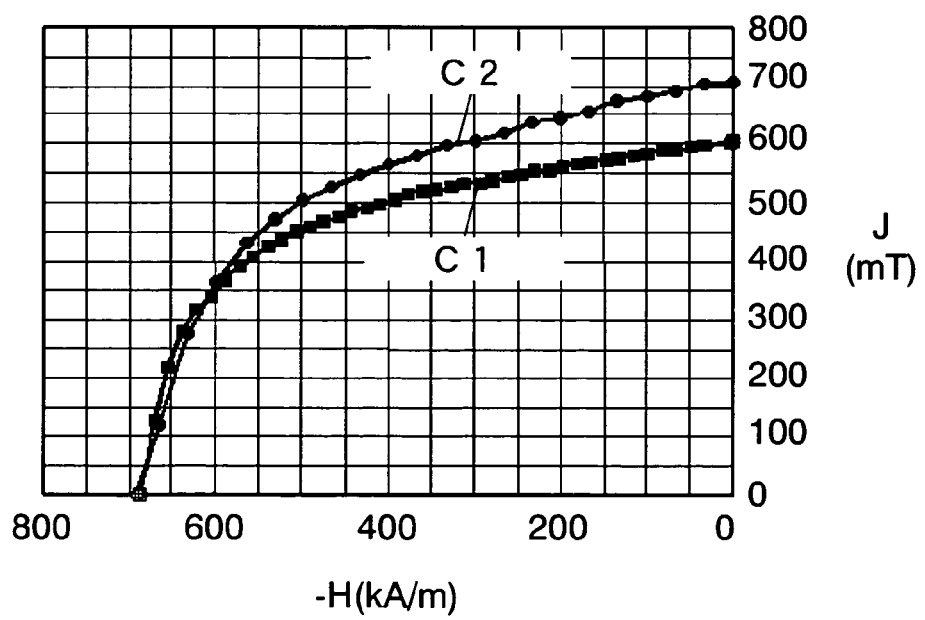
FIG. 10 shows the demagnetization curves of other flexible bonded magnets in the present invention produced from different rare earth magnetic powders.

FIG. 10 shows demagnetization curves of flexible bonded magnets produced from the magnetic powder C in the present invention. Where, curve C1 represents a magnet of 5.4 Mg/m3 density, C2 a magnet of 5.96 Mg/m3 density. These magnets have almost the same coercive force, 690 kA/m, because both are made from the same magnetic powder C. However, reflecting the difference in density, MEP of one magnet is 66 kJ/m3, while another magnet shows approximately 80 kJ/m3. The MEP value, 80 kJ/m3, is identical to that of conventional rare earth element bonded magnets. Although the bonded magnet in the present invention is a flexible bonded magnet, its density can be raised to a level as high as shown in FIG. 2 and FIG. 3; so, it exhibits superior magnetic characteristics.

Further advantage is that the magnets in the present invention can be manufactured on the conventional existing processing machines. Furthermore, since the flexible bonded magnets in the present invention can be bent or rolled thinner easily, they can be used widely in the high-efficiency small motors. Still further, since the magnets have solved a crack problem which the conventional rigid magnets can not totally get rid of, they provide a high reliability.

Figure 11:
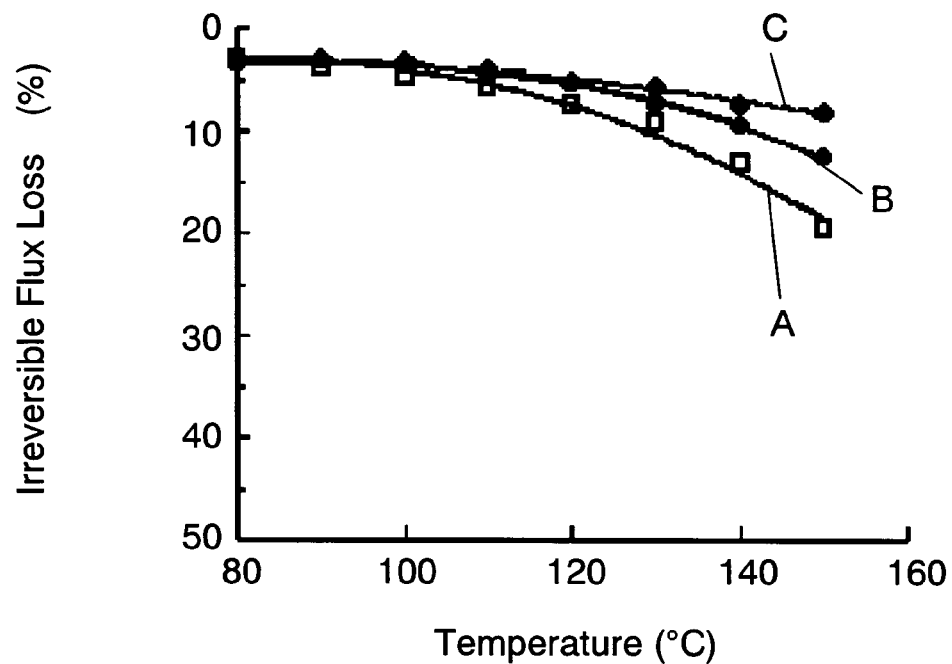
FIG. 11 is a chart showing the temperature dependence of initial irreversible flux loss in the present invention.

FIG. 11 shows the temperature dependencies of the initial irreversible flux-loss of flexible bonded magnets in the present invention. Curve A represents a flexible bonded magnet produced from the magnetic powder A, curve B that produced from the magnetic powder B, and curve C that produced from the magnetic powder C. Temperature of motor magnets in most of the operating high-technology apparatus is lower than 100° C.

So, as seen in the chart, initial irreversible flux-loss of the flexible bonded magnets in the present invention is small, in so far as they are operating in an environment where the magnet temperature can be maintained to be lower than 110° C. However, in order to ensure such a favorable magnetic stability, it is preferred that the coercive force in the normal room temperature of rare earth system magnetic powder after a 4 MA/m pulse magnetization is 600 kA/m or higher.

In the case of a magnetically anisotropic flexible bonded magnet produced from the magnetic powder A, the temperature coefficient of coercive force is approximately −0.5%/° C.; namely, it is greater than that of generally-used rare earth system magnetic powder, −0.4%/° C. Because of this, it is preferred that in the case of magnetically anisotropic magnetic powder A the coercive force in the normal room temperature after a 4 MA/m pulse magnetization is 1.1 MA/m or higher. Meanwhile, a flexible bonded magnet in the present invention which has been produced from an anisotropic rare earth system magnetic powder, such as the magnetic powder A, might have a problem of long term magnetic flux loss, the problem which an anisotropic rigid epoxy bonded magnet has.

Conventionally, the rigid epoxy bonded magnets were produced by compressing a magnetically anisotropic rare earth system magnetic powder, such as the magnetic powder A, with a compression pressure as high as approximately 980 MPa. On the other hand, a flexible bonded magnet in the present invention is manufactured with a low compression pressure which as low as approximately 40% of the conventionally-used pressure. As the result, damage on the magnetic powder A and the resultant emergence of new surfaces decrease. Therefore, the long term magnetic flux loss with the flexible bonded magnet produced from the magnetic powder A seems to decrease further in an operating temperature range lower than 100° C. As described earlier, the bonded magnet in the present invention has a favorable wrap-around property for forming a ring-shape magnet, and superior magnetic characteristics.

Figure 12:
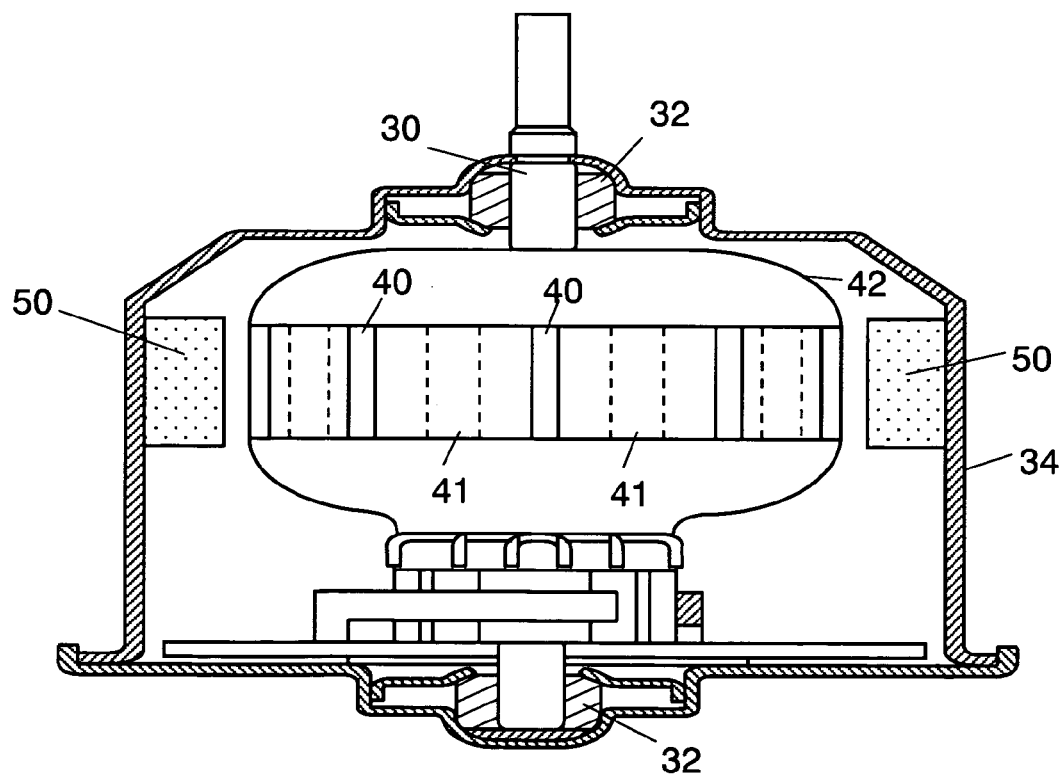
FIG. 12 shows a cross sectional view of a DC motor incorporating a flexible bonded magnet in the present invention.
Figure 13:
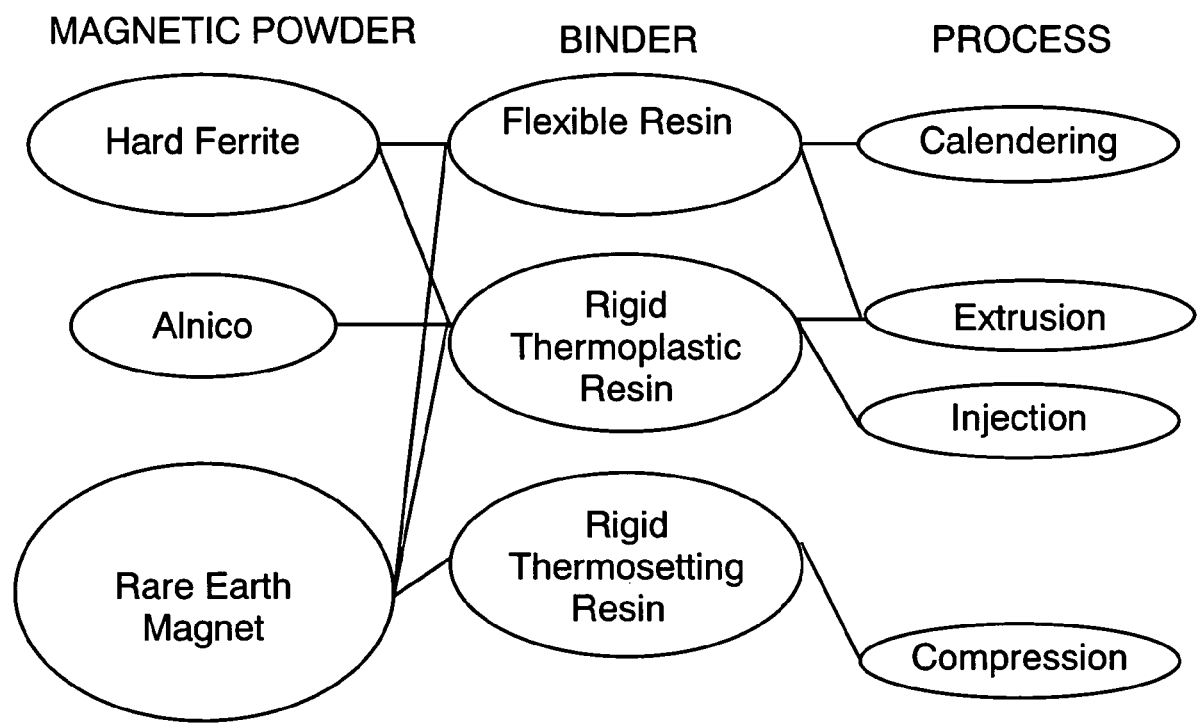
FIG. 13 shows conventional elementary technology items used for manufacturing bonded magnets.

FIG. 12 shows a cross sectional view of a small DC motor incorporating a flexible bonded magnet produced in accordance with the present invention. The motor includes shaft 30, bearing 32, frame 34, rotor 42, stator (magnet) 50, slot 40, and teeth 41. Flexible bonded magnet 50 has been shaped to a ring form, wrapped in iron frame 34, and magnetized to provide a permanent field magnet. Rotor 42 is inserted to complete a finished motor. The motor measures 24 mm in diameter, 12.5 mm in height.

The table below shows the torque constant of four types of small DC motors, incorporating, respectively, the flexible bonded magnets produced from the magnetic powder A and the magnetic powder B in the present invention, a conventional rare earth element bonded magnet and a conventional ferrite bonded magnet. The torque constant being the fundamental item of an output; the torque constant is shown standardized in the table with that of a DC motor incorporating ferrite bonded field magnet as the reference. Torque constant of a motor using a flexible bonded magnet produced from the magnetic powder A for the field magnet is 1.49 times as high compared with a motor incorporating conventional rare earth element bonded magnet. It is 3.12 times as high compared with a motor incorporating conventional ferrite bonded field magnet. Torque constant of a motor using a magnet produced from the magnetic powder B for the field magnet is 1.79 times as high compared with a motor incorporating a conventional ferrite bonded field magnet.

|  | Magnetic Powder A | Magnetic Powder B | Conventional RE Magnet | Conventional Ferrite Magnet |
| --- | --- | --- | --- | --- |
| Ratio of Torque Constant | 3.12 | 1.78 | 2.09 | 1 |

RE: Rare Earth

In some of the DC motors, cogging torque sometimes may increase when magnetic flux density is high at the air gap between rotor core iron and stator magnet. The cogging torque here means a pulsating torque caused by a change in the permeance coefficient due to rotor revolution; because there are teeth 41 and slots 40 on the outer circumferential surface of rotor core iron facing the stator. This sometimes can increase vibration and noise of a motor, or ill-affect the accuracy in position control. In a flexible bonded magnet in accordance with the present invention, however, the green sheet can be processed to have an uneven width or uneven thickness easily; this can be utilized as means to bring the air gap between rotor core iron and stator to exhibit a waveform that is closer to the sine waveform, thereby suppressing a possible increase of cogging torque. The conventional method of processing a flexible sheet magnet, such as rolling, extrusion, etc., can not reasonably meet the above-described way for the solution. In the present invention, however, a compound in powder state can be compressed into a green sheet form, the approximate thickness of which is normally 0.5-2.0 mm; so, there is a wide flexibility for the green sheet to adapt itself to any desired specific shapes and dimensions for meeting a design concept of a motor.

Second Exemplary Embodiment

In the present embodiment, a green sheet containing soft magnetic powder and a green sheet containing rare earth system magnetic powder are integrated into a single sheet. The sheet is cured, and rolled to provide a complex flexible bonded magnet of soft magnetic material. Since the complex flexible bonded magnet of soft magnetic material has been formed by unitizing a soft magnetic layer and a magnet without using an intervening adhesive layer, it can constitute a high-efficiency magnetic circuit.

Describing the process practically; prepare, a compound which contains at least one kind of soft magnetic powder selected from among the group of those having saturation magnetization 1.3 T or higher, Fe, Fe—Ni, Fe—Co, Fe—Si, Fe—N and Fe—B, in place of the rare earth system magnetic powder in the first embodiment. Produce a green sheet from the compound, and set the green sheet in a cavity of molding die. And then, fill the cavity with the first embodiment's compound in powder state, and compress them together. In this way, a complex body of green sheets having different functions is provided. Cure and roll the complex green sheet, then a flexible bonded magnet with back yoke is provided.

Another exemplary application is; compressing part of the binder ingredients in advance, and then filling the cavity with the first embodiment's compound in powder state for compression. A flexible bonded magnet having thermal bondability is thus produced. Still another, forming in advance one or more kinds of self-adhesive layer on the surface of the flexible bonded magnet by mixing blocked isocyanate with a polymer having film-forming function, such as bisphenol A type epoxy resin. By so doing, it can be used for joining the magnet ends together or with other material.

The flexible bonded magnet in the present invention can solve a problem of orientation deterioration with a magnet which has been manufactured in the radial orientation of magnetic field caused as the result of bending around a small diameter circle, namely a problem of deterioration in the magnetic characteristics. As described in the above, the present invention can offer a high-performance ring magnet whose MEP is as high as 140 kJ/m3 in radius direction, irrespective of the bending diameter. As viewed from the manufacturing facility, productivity of the magnet is high.

Furthermore, the present invention is applicable to any kinds of rare earth system magnetic powders. For example, using a magnetically isotropic rare earth system magnetic powder magnets of MEP 40 kJ/m3 level can be produced economically. It contributes also to improve efficiency of the low-efficiency small motors built with ferrite rubber magnets. The present invention does not employ a process temperature higher than 200° C., that was needed in the conventional manufacturing processes (rolling, extruding). This, too, contributes to a high manufacturing productivity. Thus the present invention will make a contribution to downsize the high-technology devices, and save the electric powers and natural resources.

INDUSTRIAL APPLICABILITY

A method of manufacturing a flexible bonded magnet in accordance with the present invention is not restricted by the magnetic powders used. Motors incorporating the magnets exhibit a high efficiency that is higher than that of motors using conventional bonded magnets produced from ferrites, rare earth element magnetic powders, etc.

The invention claimed is:

1. A method of manufacturing a flexible bonded magnet comprising the steps of
    compressing a compound consisting of
        a) rare earth system magnetic powder and
        b) flexible thermosetting resin composite,
    heat-curing a green sheet derived from the above step, and rolling the green sheet.

2. The method of manufacturing a flexible bonded magnet recited in claim 1, wherein
    the flexible thermosetting resin composite includes an solid epoxy oligomer in the normal room temperature and a polyamide powder having thermo-compression bonding property provided with stickiness in the normal room temperature.

3. The method of manufacturing a flexible bonded magnet recited in claim 2, wherein
    the flexible thermosetting resin composite contains at least one kind of adhesive agent.

4. The method of manufacturing a flexible bonded magnet recited in claim 2, wherein
    at least either one among a powder-state latent epoxy hardener and a lubricant is further used.

5. The method of manufacturing a flexible bonded magnet recited in claim 2, further comprising
    a process for covering beforehand the surface of the rare earth system magnetic powder with the epoxy oligomer.

6. The method of manufacturing a flexible bonded magnet recited in claim 2, further comprising
    a process of dissolving the epoxy oligomer in a solvent and wet-mixing with the rare earth system magnetic powder, and
    a process of crushing after removing the solvent.

7. The method of manufacturing a flexible bonded magnet recited in claim 2, wherein
    the epoxy oligomer is a novolak type epoxy resin.

8. The method of manufacturing a flexible bonded magnet recited in claim 2, wherein
    the flexible thermosetting resin composite contains an addition product of glycidyl compound and carboxylic acid.

9. The method of manufacturing a flexible bonded magnet recited in claim 4, wherein
    the powder-state latent epoxy hardener is a dihydrazide system compound.

10. The method of manufacturing a flexible bonded magnet recited in claim 4, wherein
    the lubricant is at least one item selected from the group of a higher fatty acid, a higher fatty acid amide and a metal soap whose melting points are higher than the molding die temperature.

11. The method of manufacturing a flexible bonded magnet recited in claim 1, wherein
    content of the rare earth system magnetic powder falls within a range 92 weight %-97 weight %.

12. The method of manufacturing a flexible bonded magnet recited in claim 1, wherein
    rolling rate at the rolling process is not lower than 2%, and windable limit diameter is not larger than 8 mm.

13. The method of manufacturing a flexible bonded magnet recited in claim 1, wherein
    rolling rate at the rolling process is not lower than 10%, and windable limit diameter is not larger than 2 mm.

14. The method of manufacturing a flexible bonded magnet recited in claim 1, wherein
    the green sheet is shaped to have at least either one item, an uneven width or an uneven thickness.

15. The method of manufacturing a flexible bonded magnet recited in claim 1, wherein
    the rare earth system magnetic powder is a magnetically isotropic Nd—Fe—B system spherical powder produced by the spinning cup atomization method.

16. The method of manufacturing a flexible bonded magnet recited in claim 1, wherein
    the rare earth system magnetic powder is a magnetically isotropic Nd—Fe—B system flake-shape powder produced by the melt spinning method.

17. The method of manufacturing a flexible bonded magnet recited in claim 1, wherein
    the rare earth system magnetic powder is at least one magnetically isotropic flake-shape powder selected from among the group of α-Fe/Nd—Fe—B system, Fe3B/Nd—Fe—B system, Sm—Fe—N system, and α-Fe/Sm—Fe—N system, produced by the melt spinning method.

18. The method of manufacturing a flexible bonded magnet recited in claim 1, wherein
the rare earth system magnetic powder is a magnetically anisotropic Nd—Fe—B system massive powder produced by at least either one of the hot upsetting method and the HDDR method.

19. The method of manufacturing a flexible bonded magnet recited in claim 18, wherein
coercive force at 20° C. of the rare earth system magnetic powder after a 4 MA/m pulse magnetization is not lower than 1.1 MA/m.

20. The method of manufacturing a flexible bonded magnet recited in claim 1, wherein
the rare earth system magnetic powder is a magnetically anisotropic Sm—Fe—N system fine powder produced by the RD (Reductive Diffusion) method.

21. The method of manufacturing a flexible bonded magnet recited in claim 20, wherein
coercive force at 20° C. of the magnetically anisotropic Sm—Fe—N system fine powder after a 4 MA/m pulse magnetization is not lower than 0.6 MA/m.

22. The method of manufacturing a flexible bonded magnet recited in claim 1, further comprising
a process for forming a self-bonding layer on the surface, following the rolling process.

23. The method of manufacturing a flexible bonded magnet recited in claim 22, wherein
the self-bonding layer is a hot melt type.

24. The method of manufacturing a flexible bonded magnet recited in claim 22, wherein
the self-bonding layer contains at least one kind of polymer which has a film-forming function and mixed with a blocked isocyanate.

25. A method of manufacturing a permanent magnet type motor, comprising the steps of:
compressing a compound consisting of
a) rare earth system magnetic powder and
flexible thermosetting resin composite;
heat-curing a green sheet derived from the above step;
rolling the green sheet;
forming a self-bonding layer on a surface to form a flexible bonded magnet; and
joining the flexible bonded magnet with a counterpart material including said magnet in said motor.

26. A method of manufacturing a permanent magnet type motor, comprising the steps of:
compressing a compound consisting of
a) rare earth system magnetic powder and
b) flexible thermosetting resin composite;
heat-curing a green sheet derived from the above step;
rolling the green sheet;
forming a self-bonding layer on a surface to form a flexible bonded magnet; and
joining both ends of the flexible bonded magnet wound-around to a ring shape.

* * * * *